United States Patent
Chan et al.

(10) Patent No.: US 7,886,043 B1
(45) Date of Patent: Feb. 8, 2011

(54) HYBRID METHOD AND APPARATUS FOR URL FILTERING

(75) Inventors: Kong Yew Chan, San Mateo, CA (US); Shuosen Robert Liu, San Jose, CA (US); Jianda Li, San Jose, CA (US); Bharath Kumar Chandra Sekhar, Santa Clara, CA (US); Pei-wei Wu, Sunnyvale, CA (US)

(73) Assignee: Trend Micro Inc, Tokyo (JP)

( * ) Notice: Subject to any disclaimer, the term of this patent is extended or adjusted under 35 U.S.C. 154(b) by 543 days.

(21) Appl. No.: 11/693,386

(22) Filed: Mar. 29, 2007

(51) Int. Cl.
  *G06F 15/173* (2006.01)
  *G06F 12/00* (2006.01)
  *G06F 7/00* (2006.01)
  *H04W 4/00* (2009.01)

(52) U.S. Cl. ................ 709/224; 370/338; 711/108; 707/3

(58) Field of Classification Search ......... 709/217–229; 370/338; 707/3; 711/108
  See application file for complete search history.

(56) References Cited

U.S. PATENT DOCUMENTS

| | | | |
|---|---|---|---|
| 2003/0169713 A1* | 9/2003 | Luo | 370/338 |
| 2003/0233514 A1* | 12/2003 | Honig | 711/108 |
| 2005/0060297 A1* | 3/2005 | Najork | 707/3 |
| 2007/0233851 A1* | 10/2007 | Ma | 709/224 |

* cited by examiner

*Primary Examiner*—Ian N Moore
*Assistant Examiner*—Kiet Tang
(74) *Attorney, Agent, or Firm*—IP Strategy Group, P.C.

(57) ABSTRACT

Methods and apparatus for rating Uniform Resource Locators (URLs) are disclosed. The method includes determining a request size pertaining to a length of the URL to be rated and for generating a rating request message containing the URL. The rating request message is a DNS (domain name system) message if the request size is less than or equal to a predefined size limitation, and the rating request message is a HTTP (hypertext transfer protocol) message if the request size is greater than the predefined size limitation.

16 Claims, 5 Drawing Sheets

| Mechanism — 502 | HTTP — 504 | DNS — 506 | Hybrid (HTTP & DNS) — 508 |
|---|---|---|---|
| Scalability — 510 | Average | High | Above Average — 516 |
| Latency — 518 | High | Low | Average — 524 |
| Reliability — 526 | High | Average | Above Average — 532 |
| Support URL Maximum Length — 534 | ✓ — 536 | NO — 538 | ✓ — 540 |

FIG. 5

HYBRID METHOD AND APPARATUS FOR URL FILTERING

BACKGROUND OF THE INVENTION

The Internet is a collection of interconnected computer networks, which has long been employed for data management, sharing, and searching. As the Internet continues to evolve, the data being transmitted increases in volume and variety. With this increase in volume and variety, the risk of malicious and/or inappropriate information/contents on the Internet also increases. Inhibiting intentional or unintentional access to malicious and/or inappropriate information/contents is a critical task for individuals and organizations alike.

One technique to inhibit the intentional or unintentional access to malicious and/or inappropriate/contents involves the use of Internet filters, for example, Uniform Resource Locator (URL) filtering. URL filtering works by, for example, examining a URL that is requested by a client browser in order to decide whether to allow or prohibit access to the website associated with the URL. Generally speaking, URL filtering may employ one or more URL rating servers for examining the URL.

FIG. 1 shows an example of URL filtering involving a client 104, a gateway with URL filtering 104, and a Hyper Text Transfer Protocol (HTTP) URL rating server 114, representing a typical prior art URL filtering method. Gateway with URL filtering 104 intercepts the URL forwarded by client 104 is attempting to access the website associated with the URL. Once the URL is intercepted by gateway with URL filtering 104, gateway with URL filtering 104 then forwards the URL as-is by was of the Internet 112 to HTTP URL rating server 1114, for example, Trend Micro URL Filtering Engine (TMUFE), over the HTTP protocol, which is based on Transmission Control Protocol (TCP). HTTP URL rating server 114 then employs a rating scheme to categorize/rate the URL. After the categorizing/rating for the URL is generated, HTTP URL rating server 114 then delivers a response back to gateway with URL filtering 104. Gateway with URL filtering 104 subsequently receives the response from HTTP URL rating server 114 and applies the policy accordingly to either allow or deny access of the URL by client 102.

However, there are at least two problems with the prior art URL filtering technique. Because TCP protocol tends to be fairly heavy and cause latency, congestion can occur when a large number of gateways with URL filtering 104 forward their numerous URLs by way of the Internet 112 over HTTP protocol. Also, congestion can occur when gateway with URL filtering 104 forwards the URL as-is to HTTP URL rating server 114 because URLs tend to be very large. Therefore, because URLs lend to be large bandwidth utilization increases.

Another drawback of the prior art URL filtering method is on URL rating server 122 side. When HTTP URL rating server 114 employs a rating scheme to categorize/rate the URL, a string-based lookup can be very expensive. String-based lookup is expensive because of the high computational requirement and therefore more server bandwidth is required.

SUMMARY OF INVENTION

The invention relates, in one or more embodiments, to methods for rating a Uniform Resource Locator (URL). The method includes determining a request size pertaining to a length of the URL to be rated. The method also includes generating a rating request message containing the URL, wherein the rating request message is a DNS (domain name system) message if the request size is less than or equal to a predefined size limitation, and wherein the rating request message is a HTTP (hypertext transfer protocol) message if the request size is greater than the predefined size limitation.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 shows, in accordance with an embodiment of the invention, a table comparing attributes of HTTP URL Filtering, DNS URL Filtering, and Hybrid URL Filtering.

DETAILED DESCRIPTION OF EMBODIMENTS

Figure 1:
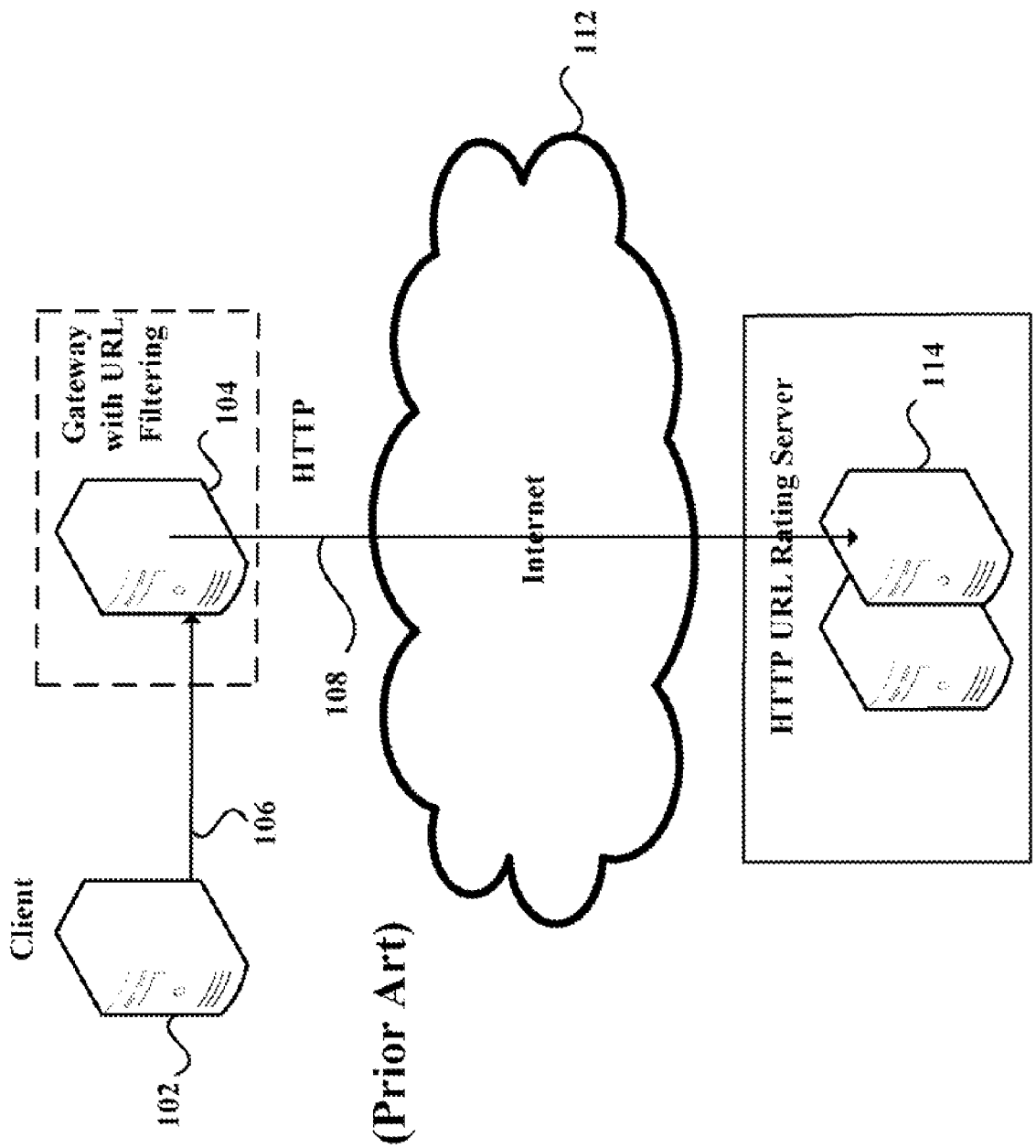
FIG. 1 shows an example of a typical URL filtering arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical. or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. When so programmed, logic is configured in these apparatus to perform different tasks at the same or different times according to the programming code.

Embodiments of the invention relate to apparatus and methods for servicing URL rating requests and URL rating responses using one or both of HTTP-based URL filtering and DNS-based URL filtering. Generally speaking, HTTP-based URL filtering employs a HTTP-based URL rating server that rates HTTP-based URL requests. As is known, HTTP-based URL requests are requests that are transmitted using the HTTP protocol, which is based on the Transmission Control Protocol (TCP). Likewise, DNS-based URL filtering employs DNS-based URL rating server that rates DNS-based URL requests. As is known, DNS-based URL requests are requests that are transmitted using the DNS protocol, which is based on the User Datagram Protocol (UDP) and/or Transmission Control Protocol (TCP). As discussed, the HTTP protocol can transport any length URL. On the other hand, the DNS protocol, when based on UDP, tends to carry the payload in the text record data field of the UDP packet and thus can transport around 255 characters per packet.

In contrast to the prior art approach of employing HTTP protocol for all requests and responses, the invention may employ the DNS protocol for some requests and responses. By employing the DNS protocol, network bandwidth usage is reduced. The reduction in network bandwidth usages is due to DNS based requests and responses being fairly light weight and having low latency. Furthermore, since DNS-based URL rating requests are less than about 255 characters, less computing resource is required in process these shorter DNS-based URL rating requests. Accordingly, congestion is reduced at a typical DNS-based URL rating server compared to the congestion level at a HTTP-based URL rating server.

Figure 2:
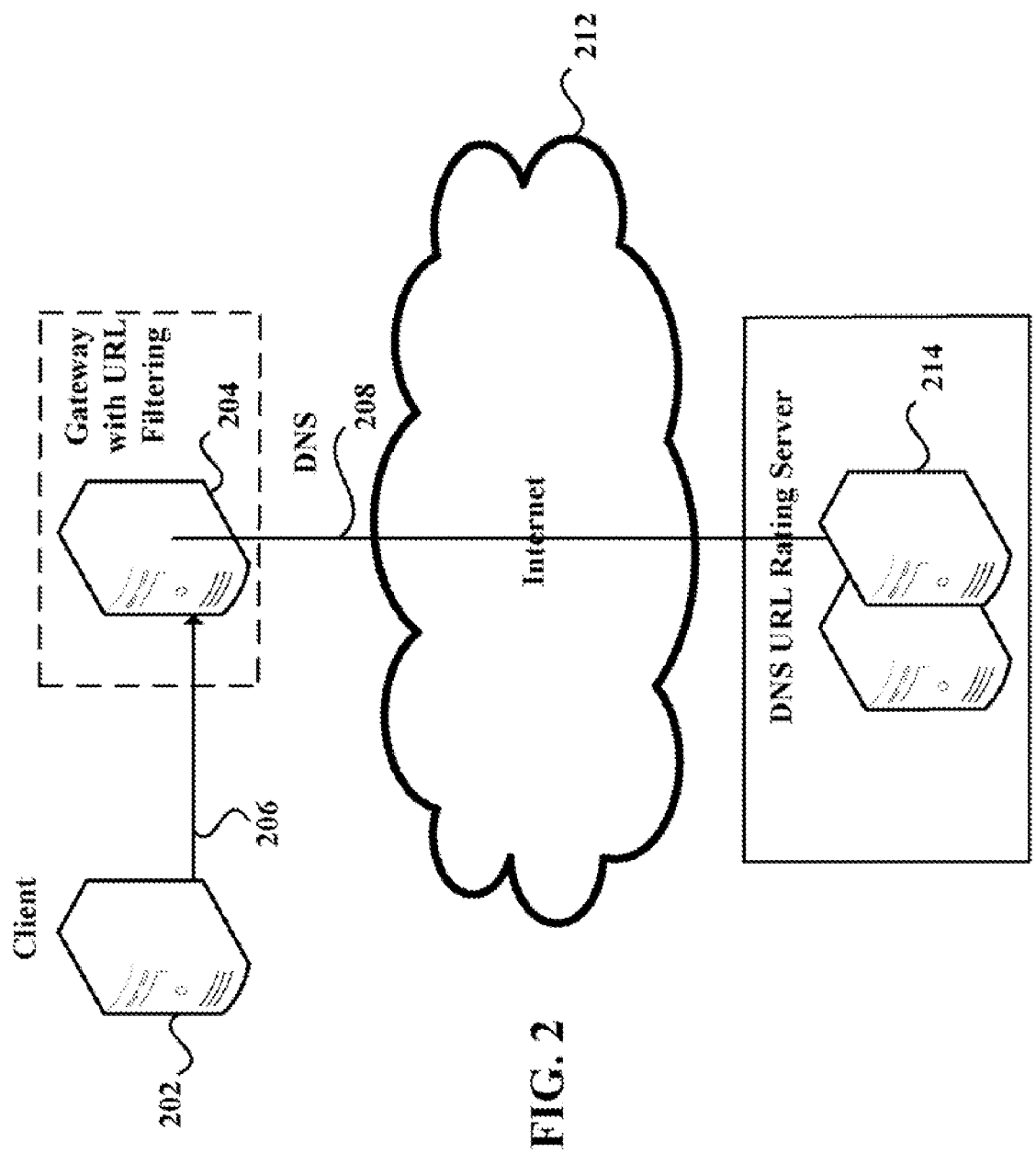
FIG. 2 shows, in accordance with an embodiment of the present invention, an example of DNS URL filtering.

The features and advantages of the invention may be better understood with reference to the figures and discussions that follow. FIG. 2 shows, in accordance with an embodiment of the present invention, an example of DNS URL filtering involving a client 202, a gateway with URL filtering 204, and a DNS-based URL rating server 214, representing an example URL filtering method employing the DNS protocol. In DNS-based URL filtering, URL filtering client 204 intercepts the URL forwarded by client 202 that is attempting to access the website associated with the URL. Once the URL is intercepted by the gateway with URL filtering 204, gateway with URL filtering 204 may forward the URL request using the DNS protocol, which is based on UDP and/or TCP, to a DNS-based URL rating server 214.

DNS-based URL rating server 214 then employs a rating scheme to categorize/rate the URL. After the categorizing/rating for the URL is generated, DNS-based URL rating server 214 then delivers a DNS response back to gateway with URL filtering 204. Gateway with URL filtering 204 subsequently receives the DNS response from DNS-based URL rating server 214 and applies the policy accordingly to either allow or deny access of the URL by client 202.

Generally speaking, DNS-based responses and requests are fairly light weight and has low latency, therefore, network bandwidth usage is reduced. This is because UDP-based DNS packets tend to be small (51.2 bytes) and can typically carry only about 255 characters of information, such as the URL information. Accordingly, one requirement of DNS-based URL filtering is the requirement that the URL be less than or equal 255 characters in length for URL filtering requests, and that the URL rating information is less than or equal to 255 characters. However, since DNS-based URL rating requests and responses are less than about 255 characters, less computing resource is required to process these shorter DNS-based URL rating requests and responses. Because less computer resource is required to process these shorter DNS-based URL rating response, congestion may be reduced at a typical DNS-based URL rating server.

Figure 3:
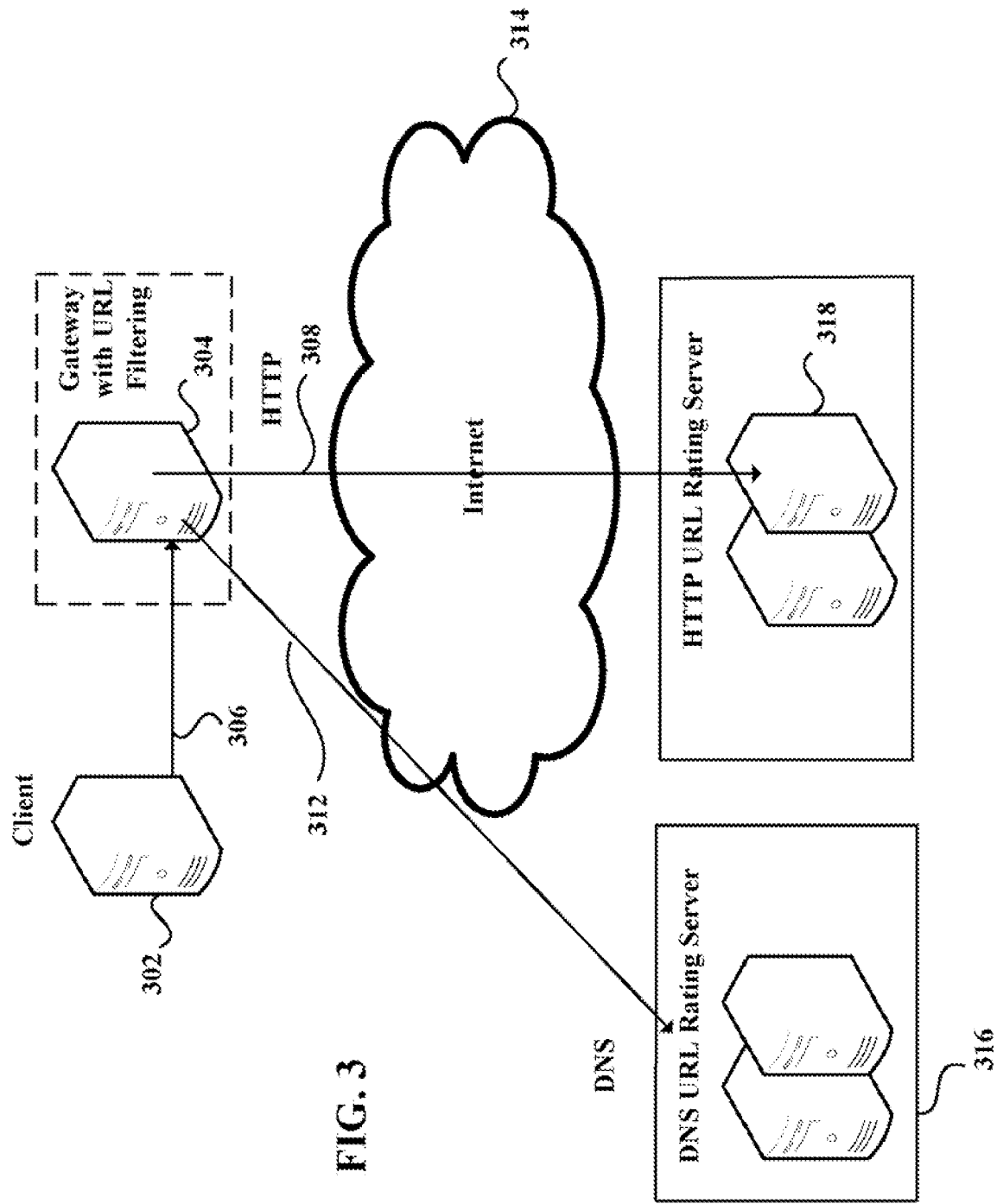
FIG. 3 shows, in accordance with an embodiment of the present invention, an example of hybrid URL filtering.

FIG. 3 shows, in accordance with an embodiment of the present invention, an example of a hybrid URL filtering arrangement involving a client 302, a gateway with hybrid URL filtering 304, DNS-based URL rating server 316, and HTTP-based URL rating server 318. As shown in FIG. 3, a URL request is generated by client 302 and intercepted by gateway with hybrid URL filtering 304 before access to the website is granted or denied. Gateway with hybrid URL filtering 304 then computes the length of the URL string. If the length of the URL string is equal or less than 255 characters, gateway with hybrid URL filtering 304 forwards the URL request by way of the internet 314, using the DNS protocol, to a DNS-based URL rating server 316. In contrast, if the length of the URL string is greater then 255 characters, gateway with hybrid URL filtering 304 may forward the URL request by way of the internet, using the HTTP protocol, to a HTTP-based URL filtering server 318.

Once the URL request is received by the URL rating server (either the DNS-based URL rating server or the HTTP-based URL rating server), the URL rating server than employs a rating scheme to categorize/rate the URL. In one or more embodiments, if the URL rating request is sent via the DNS protocol, the corresponding URL rating response is returned via the DNS protocol. Likewise, if the URL rating request is sent via the HTTP protocol, the corresponding URL rating response is returned via the HTTP protocol.

Irrespective whether the HTTP protocol or the DNS protocol is employed for the URL rating response, gateway with hybrid URL filtering 304 receives the URL rating response and applies the access policy accordingly to either allow or deny access by client 302 to the website represented by the URL.

Figure 4:
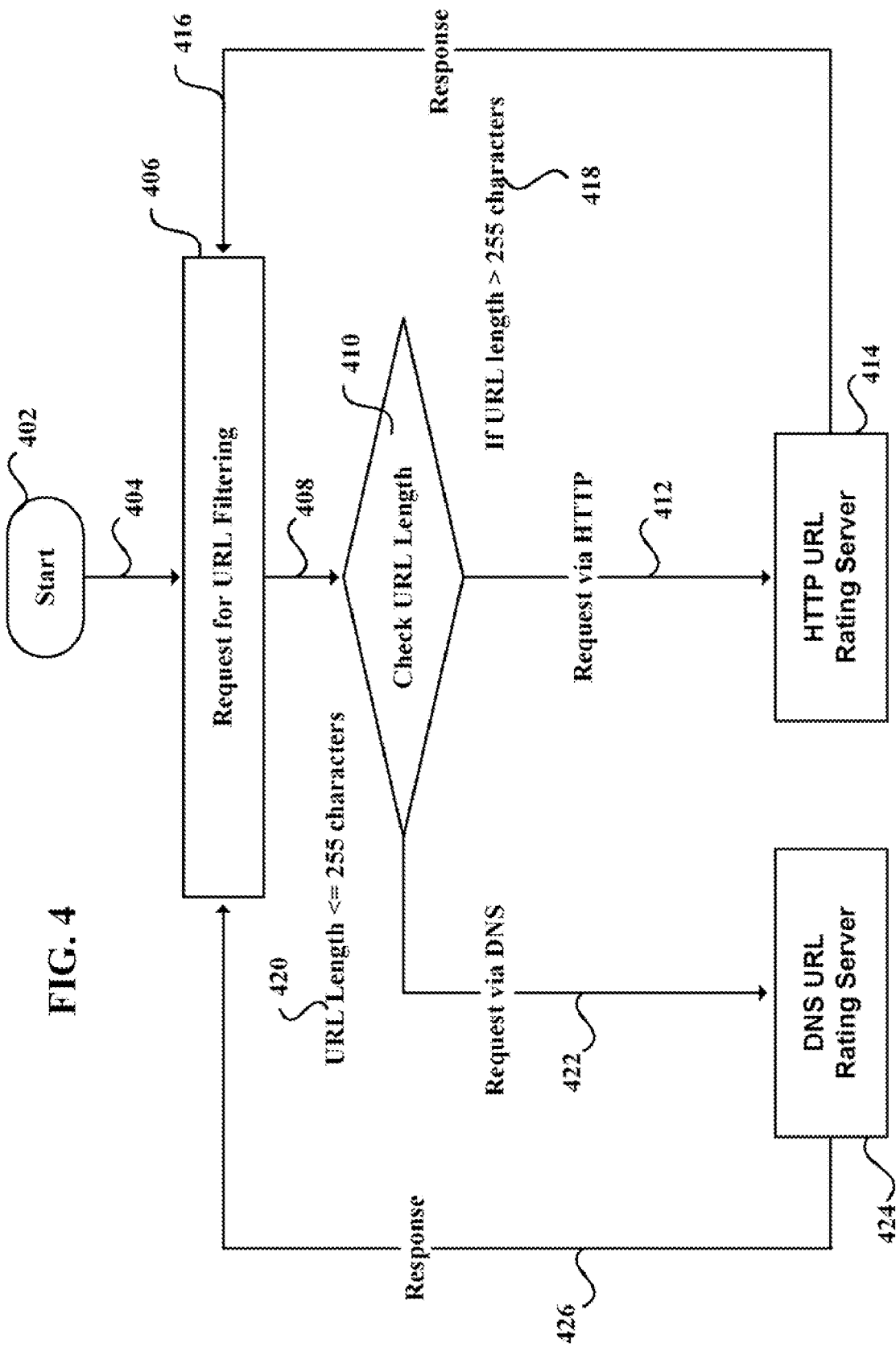
FIG. 4 shows, in accordance with an embodiment of the present invention, a flowchart of the hybrid URL filtering method steps.

FIG. 4 shows, in accordance with an embodiment of the present invention, a flowchart of the hybrid URL filtering method. As shown in FIG. 4, the hybrid URL filtering method starts with step 402, at which a URL filtering client 202 (as shown in FIG. 2) receives the URL request to be rated. Gateway with URL filtering 204 is different from the client browser, and may be implemented at any node on the network (such as gateway device or router). URL filtering client 204 may also be implemented, if desired, in the same client machine that provides the client browser. URL filtering client 204 then computes the length of URL string 406. If the length of the URL string is equal or less than 255 characters 420, URL filtering client 204 may forward the URL request using the DNS protocol to a DNS-based URL rating server 424. In contrast, if the length of the URL string is greater then, 255 characters 418, URL filtering client 204 may forward the URL request using the HTTP protocol to a HTTP-based URL filtering server 414.

Once the URL has been forwarded to DNS-based URL Rating Server 424, DNS-based URL Rating Server 424 then employs a rating scheme to categorize/rate the URL. After the categorizing/rating for the URL is generated, DNS-based URL Rating Server 424 then delivers a DNS response back to URL filtering client 204. Similarly, if HTTP-based URL rating server 414 is employed to rate the URL requested, HTTP-based URL rating server 414 then employs a rating scheme to categorize/rate the URL. After the categorizing/rating for the URL is generated, HTTP-based URL Rating Server 414 then delivers a HTTP response back to URL filtering client 204.

In one or more embodiments, if the URL rating response is shorter than or equal to 255 characters, then the ms protocol may be employed to transmit the categorizing/rating back to URL filtering client 204. In one or more embodiments, if the URL rating response is longer than 255 characters, then the HTTP protocol will be employed to transmit the categorizing/rating back to URL filtering client 204.

The Table of FIG. 5 shows, in accordance with an embodiment of the invention, a comparison between HTTP URL Filtering, DNS URL Filtering, and Hybrid URL Filtering. As shown in the Table of FIG. 5, under the column labeled "HTTP/TCP" 504 and in the row labeled "Scalability" 510, the scalability of employing just the HTTP protocol to transmit the URL rating requests or responses is average. This is because HTTP is a fairly heavy-weight protocol, and the larger payload of HTTP requires a lot of processing power on the part of the HTTP-based URL rating server to service a given number of URL rating requests/URL rating responses, thereby limiting the scalability of a HTTP-based URL rating arrangement.

The Table of FIG. 5 further shows, under the column labeled "DNS/UDP" 506 and in the row labeled "Scalability" 510, the scalability of employing just the DNS protocol to transmit the URL requests or responses to be relatively high. This is because the UDP-based DNS is highly efficient, both in terms of the transmission bandwidth and in terms of the lower processing power requirement on the part of the DNS-based URL rating server.

In contrast, by employing the Hybrid URL filtering apparatus and method, which may involve both the HTTP protocol and the DNS protocol as transport, the scalability may increase to about above average, which is greater than employing HTTP protocol alone. This is because, in an embodiment, the gateway URL filtering device intelligently and selectively picks the more efficient transport of the two protocols (e.g., DNS over HTTP) whenever possible.

With respect to latency, the use of the Hybrid URL Filtering apparatus and method also results in an improvement. As shown in the Table of FIG. 5, under the column labeled "HTTP/TCP" 504 and in the row labeled "Latency" 518, the latency of employing just the HTTP protocol to transmit the URL requests or responses is high. This is because, as mentioned earlier, HTTP is capable of carrying a greater payload but requires more transmission bandwidth and greater processing power on the part of the HTTP-based URL rating server. These requirements translate into a higher latency.

The Table of FIG. 5 also shows, under the column labeled "DNS/UDP" 506 and in the row labeled "Latency" 518, the latency of employing just the DNS protocol alone to transmit the URL requests or responses to be relatively low. Again, the transmission bandwidth efficient UDP-based DNS protocol, with its characteristic low processing load, results in lower latency.

When both HTTP and DNS are employed to service URL rating requests and/or URL rating responses, the Hybrid URL filtering apparatus and method, which may include both HTTP protocol and DNS protocol, results in a latency that is about average, which is greater than the latency experienced when employing the DNS protocol alone. However, this is an acceptable trade-off since the hybrid URL filtering apparatus and method can accommodate both short URL rating requests/responses (via DNS) as well as longer URL rating requests/responses (via HTTP). If DNS had been the sole transport, URL rating requests and/or URL rating responses having a length longer than the DNS payload size (about 255 characters in an embodiment) would have been disadvantageously dropped, i.e., unserviced.

As shown in the Table of FIG. 5, under the column labeled "HTTP/TCP" 504 and in the row labeled "Reliability" 526, The reliability of employing just HTTP protocol to transmit the URL requests or responses is high. This is because the TCP-based HTTP protocol, although heavy weight, is configured to retransmit dropped packets, thereby ensuring a high degree of transmission reliability. In contrast, the Table of FIG. 5 shows, under the column labeled "DNS/UDP" 506 and in the row labeled "Reliability" 526, the reliability of employing just the DNS protocol alone to transmit the. URL requests or responses tends to be about average. By employing the Hybrid URL filtering apparatus and method, which may include both BTU protocol and DNS protocol, the reliability may increase to about above average, which is higher than the reliability that results from employing the DNS protocol alone. The improvement in reliability may be attributable to the use of the HTTP protocol to transmit larger URL rating requests and/or larger URL rating responses, i.e., the larger URL rating requests and/or larger URL rating responses do not have to be dropped. The improvement in reliability may also be attributable to the use of the retransmit facility of HTTP.

As shown in the Table of FIG. 5, under the column labeled "HTTP/TCP" 504 and in the row labeled "Support URL Maximum Length" 534, the HTTP protocol is capable of supporting URLs of greater lengths, up to any arbitrary size URL rating request/URL rating responses in an embodiment. In contrast, the Table of FIG. 5 shows, under the column labeled "DNS/UDP" 506 and in the row labeled "Support URL Maximum Length" 534, the DNS protocol is shown to be incapable of supporting long URLs (i.e., those larger than the DNS packet payload). By employing the Hybrid URL filtering apparatus and method, which may include both HTTP protocol and DNS protocol, URLs of maximum length can be supported by HTTP while shorter URLs can be supported by DNS.

As can be appreciated from the foregoing, embodiments of the invention flexibly and selectively employ the strengths of HTTP and DNS in servicing URL rating requests and/or URL rating responses. In so doing, embodiments of the invention enjoy the scalability, low latency, and efficiency advantages of the DNS protocol when relatively short URL rating requests and/or URL rating responses are involved. If the size of the URL rating requests and/or URL rating responses exceeds the payload capacity of the DNS packet payload, embodiments of the invention take advantage of greater payload capacity of the HTTP protocol, as well as the reliability of the HTTP protocol, in order to service the longer URL rating requests/URL rating responses. By combining both protocols, embodiments of the invention offer advantages not found when employing either protocol alone as the transport mechanism for URL filtering.

While this invention has been described in terms of several embodiments, there are alterations, permutations, and equivalents, which fall within the scope of this invention. It should also be noted that there are many alternative ways of implementing the methods and apparatuses of the present invention. Further, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for rating a Uniform Resource Locator (URL), the method comprising:
   determining a request size pertaining to a length of the URL to be rated;
   generating a rating request message containing the URL;
   after the determining and the generating, requesting a domain name system-based URL rating server (DNS-based URL rating server) to categorize the URL by sending the rating request message to the DNS-based URL rating server if the request size is less than or equal to a predefined size limitation; and after the determining and the generating, requesting a hypertext transfer protocol-based URL rating server (HTTP-based URL rating server) to categorize the URL by sending the rating request message to the HTTP-based URL server if the request size is greater than the predefined size limitation;

providing, using the DNS-based URL rating server, first URL rating information pertaining to the URL in a DNS response message if the URL is received via a DNS message; and providing, using the HTTP-based URL rating server, second URL rating information pertaining to the URL in an HTTP response message if the URL is received via an HTTP message, wherein the rating request message is the DNS message if the request size is less than or equal to the predefined size limitation, and wherein the rating request message is the HTTP message if the request size is greater than the predefined size limitation.

2. The method of claim 1 wherein the DNS message is configured to be transported using UDP (user datagram protocol).

3. The method of claim 1 wherein the predefined size limitation represents a payload capacity according to a DNS protocol.

4. The method of claim 1 further comprising intercepting a URL request, the URL request being generated by a client for accessing a website.

5. The method of claim 1 wherein the determining is performed by a gateway device.

6. The method of claim 1 wherein the determining is performed by a client device that executes a browser program.

7. The method of claim 6 further comprising transporting the DNS response message using UDP.

8. The method of claim 1 further comprising transporting the DNS response message using UDP.

9. An article of manufacture comprising a non-transitory computer readable medium configured to store computer readable code for rating a Uniform Resource Locator (URL), the article of manufacture comprising:

computer readable code for determining a request size pertaining to a length of the URL;

computer readable code for generating a rating request message containing the URL;

computer readable code for requesting a domain name system-based URL rating server (DNS-based URL rating server) to categorize the URL by sending the rating request message to the DNS-based URL rating server after the determining and the generating if the request size is less than or equal to a predefined size limitation; and computer readable code for requesting a hypertext transfer protocol-based URL rating server (HTTP-based URL rating server) to categorize the URL by sending the rating request message to the HTTP-based URL rating server after the determining and the generating if the request size is greater than the predefined size limitation;

computer readable code for providing, using the DNS-based URL rating server, first URL rating information pertaining to the URL in a DNS response message if the URL is received via a DNS message; and computer readable code for providing, using the HTTP-based URL rating server, second URL rating information pertaining to the URL in an HTTP response message if the URL is received via an HTTP message, wherein the rating request message is the DNS message if the request size is less than or equal to a predefined size limitation, and wherein the rating request message is the HTTP message if the request size is greater than the predefined size limitation.

10. The article of manufacture of claim 9 wherein the predefined size limitation represents a payload capacity according to a DNS protocol.

11. The article of manufacture of claim 9 further comprising:

computer readable code for intercepting a URL request, the URL request being generated by a client for accessing a website.

12. A gateway device configured for rating a Uniform Resource Locator (URL), said URL pertaining to a request to access a website by a browser, the gateway device comprising:

logic for determining a request size pertaining to a length of the URL to be rated;

logic for generating a rating request message containing the URL;

logic for requesting a domain name system-based URL rating server (DNS-based URL rating server) to categorize the URL by sending the rating request message to the DNS-based URL rating server after the determining and the generating if the request size is less than or equal to a predefined size limitation; and logic for requesting a hypertext transfer protocol-based URL rating server (HTTP-based URL rating server) to categorize the URL by sending the rating request message to the HTTP-based URL server after the determining and the generating if the request size is greater than the predefined size limitation;

logic for providing, using the DNS-based URL rating server, first URL rating information pertaining to the URL in a DNS response message if the URL is received via a DNS message; and logic for providing, using the HTTP-based URL rating server, second URL rating information pertaining to the URL in an HTTP response message if the URL is received via an HTTP message, wherein the rating request message is the DNS message if the request size is less than or equal to a predefined size limitation, and wherein the rating request message is the HTTP message if the request size is greater than the predefined size limitation.

13. The gateway device of claim 12 wherein the DNS message is configured to be transported using UDP (user datagram protocol).

14. The gateway device of claim 12 wherein the predefined size limitation represents a payload capacity according to a DNS protocol.

15. The gateway device of claim 12 wherein the predefined size limitation represents a size of a text record field according to a DNS protocol.

16. The gateway device of claim 12 further comprising:

logic for intercepting a URL request, the URL request being generated by a client for accessing a website.

* * * * *